United States Patent
Sharma (12)

(10) Patent No.: US 8,996,351 B2
(45) Date of Patent: Mar. 31, 2015

(54) CLOUD-BASED TRANSLATION SERVICE FOR MULTI-FUNCTION PERIPHERAL

(75) Inventor: Deeksha Sharma, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 363 days.

(21) Appl. No.: 13/217,198

(22) Filed: Aug. 24, 2011

(65) Prior Publication Data

US 2013/0054222 A1 Feb. 28, 2013

(51) Int. Cl.
*G06F 17/28* (2006.01)
*H04N 1/00* (2006.01)
*G06K 9/03* (2006.01)
*G06K 9/00* (2006.01)
*G06K 9/32* (2006.01)
*G06K 9/68* (2006.01)

(52) U.S. Cl.
CPC ............ *H04N 1/00244* (2013.01); *G06K 9/033* (2013.01); *H04N 1/00331* (2013.01); *G06K 9/00442* (2013.01); *G06K 9/3283* (2013.01); *G06K 9/6842* (2013.01); *G06F 17/289* (2013.01); *H04N 1/00408* (2013.01); *H04N 1/00474* (2013.01); *H04N 1/00482* (2013.01); *H04N 2201/001* (2013.01); *G06F 17/2836* (2013.01)
USPC .......... 704/2; 704/3; 704/4; 382/321; 715/234

(58) Field of Classification Search
CPC .............. G06F 17/289; G06F 17/2872; G06F 17/2827; G06F 17/2836; G06F 17/2818; G06F 17/2755; G06F 9/4448; G06F 17/2785; G06F 17/2735; G10L 15/22; G10L 15/30; G10L 15/265; H04N 2201/3226; H04N 1/32122
USPC ........... 704/2, 4, 5, 8, 9, 10, 270, 270.1, 275; 358/403
See application file for complete search history.

(56) References Cited

U.S. PATENT DOCUMENTS

| | | | |
|---|---|---|---|
| 5,627,661 A * | 5/1997 | Negishi et al. ................ 358/470 |
| 6,937,974 B1 * | 8/2005 | d'Agostini ....................... 704/2 |
| 7,769,249 B2 | 8/2010 | Kasatani | |
| 8,503,786 B2 * | 8/2013 | Sata et al. ..................... 382/181 |

(Continued)

FOREIGN PATENT DOCUMENTS

WO  WO 02/29622 A1  4/2002

OTHER PUBLICATIONS

European Patent Office, "Search Report" in application No. 12181098.0-1902, dated Jul. 31, 2014, 10 pages.

*Primary Examiner* — Vincent P Harper
(74) *Attorney, Agent, or Firm* — Hickman Palermo Becker Bingham LLP

(57) ABSTRACT

Techniques are provided for translating a document that was scanned by a multi-function peripheral (MFP). A server within a computing cloud receives an MFP identifier and processed scan data that results from optical character recognition and/or natural language translation having been performed on scan data produced by the MFP. In response to the receipt of the processed scan data at the server, the server selects a set of rules that is mapped to a context to which the MFP identifier is mapped. Corrected processed scan data is generated by applying the set of rules to the processed scan data that was received by the server. Manual corrections made to the corrected processed scan data may be used to update the set of rules so that those corrections are also made to other processed scan data produced by MFPs having identifiers mapped to the same context.

20 Claims, 13 Drawing Sheets

(56) References Cited

U.S. PATENT DOCUMENTS

| | | | |
|---|---|---|---|
| 2002/0156816 A1* | 10/2002 | Kantrowitz et al. | 707/530 |
| 2003/0200078 A1 | 10/2003 | Luo et al. | |
| 2004/0101198 A1 | 5/2004 | Barbara | |
| 2004/0102957 A1 | 5/2004 | Levin | |
| 2005/0022114 A1* | 1/2005 | Shanahan et al. | 715/513 |
| 2006/0041590 A1* | 2/2006 | King et al. | 707/104.1 |
| 2006/0200339 A1 | 9/2006 | Satake et al. | |
| 2006/0285746 A1* | 12/2006 | Yacoub et al. | 382/176 |
| 2009/0138965 A1 | 5/2009 | Ferlitsch | |
| 2009/0259612 A1* | 10/2009 | Hanson | 706/47 |
| 2010/0287215 A1* | 11/2010 | Lasensky et al. | 707/805 |

\* cited by examiner

CLOUD-BASED TRANSLATION SERVICE FOR MULTI-FUNCTION PERIPHERAL

FIELD OF THE INVENTION

The present invention relates to a technique for translating, in a computing cloud, a document that was scanned by a multi-function peripheral.

BACKGROUND

Multi-function peripherals (MFPs), such as those manufactured and sold by Ricoh Corporation, are capable of performing a variety of different functions relative to paper documents. Such MFPs typically are capable of scanning documents, printing documents, copying documents, stapling documents, punching holes in documents, storing digital copies of scanned documents, etc.

Some MFPs even have the built-in capability to perform automatic processing of the digital copies of the documents that they scan. U.S. Pat. No. 7,769,249 (issued Aug. 3, 2010), assigned to Ricoh Company, Ltd., describes a document optical character recognition (OCR)-implementing device. The device includes a reading part that is configured to read a document and form a recognition image. The device additionally includes an obtaining part that is configured to perform image processing of the recognition image. The device additionally includes OCR engines that are configured to perform a character recognition process on the recognition image. Unfortunately, automatically performed OCR processing is prone to errors, and the results are often unsatisfactory to users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for translating a document that was scanned by a multi-function peripheral (MFP). A server within a computing cloud receives (a) an MFP identifier of an MFP and (b) processed scan data that resulted from optical character recognition and/or natural language translation having been performed on scan data originally produced by the MFP. In response to the receipt of the processed scan data at the server, the server selects, from a group of context-specific rules sets, a particular context-specific rule set that is mapped to a context to which the MFP identifier is mapped; different context-specific rule sets may be mapped to different contexts, and different MFP identifiers may be mapped to different contexts. Corrected processed scan data is generated by applying the selected set of context-specific rules to the processed scan data that was received by the server. User-made manual corrections later made to the corrected processed scan data may be used to update the selected set of context-specific rules (while leaving other unselected sets of context-specific rules unaffected) so that those corrections are also made to other processed scan data produced by MFPs having identifiers mapped to the same context.

BRIEF DESCRIPTION OF THE DRAWINGS

In the drawings:

FIG. 11 shows an example of user-corrected translated text that corrects an error in machine-made translation shown in FIG. 10, according to an embodiment of the invention;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Using techniques described herein, a multi-function peripheral (MFP) scans a document and transmits the resulting scanned data to a server that resides within a computing cloud. The server (potentially acting in concert with other specialized servers also located in the computing cloud) performs services relative to the scanned data on behalf of the MFP. For example, such services may include optical character recognition and natural language translation relative to the written content contained in the scanned data. The MFP is associated with a unique device identifier that is only associated with that MFP and no other device that utilizes the cloud-based services. Using the MFP's device identifier, the cloud-based services can specially tailor the processing that is performed relative to data that is received from the MFP. Using the MFP's device identifier, the cloud-based services can classify (e.g., by purpose) scan data received from the MFP. The classification adds context that can be used to enhance services performed for the MFP (and for other MFPs having similar contexts); the enhancement may involve a more accurate optical character recognition and a more accurate natural language translation. Consequently, optical character recognition accuracy and natural language translation accuracy increases for all MFPs having similar purposes and providing similar types of documents.

After corrections have been automatically made to OCR processing results and natural language translation processing results using MFP context-specific rules that are stored in a database, users are given the opportunity to further correct the OCR processing results and natural language translation processing results. In one embodiment, these manually made corrections are used to update the MFP context-specific rules in the database so that automatic corrections made to future documents using those rules will be even more accurate.

Cloud-Based Translation Service System

Figure 1:
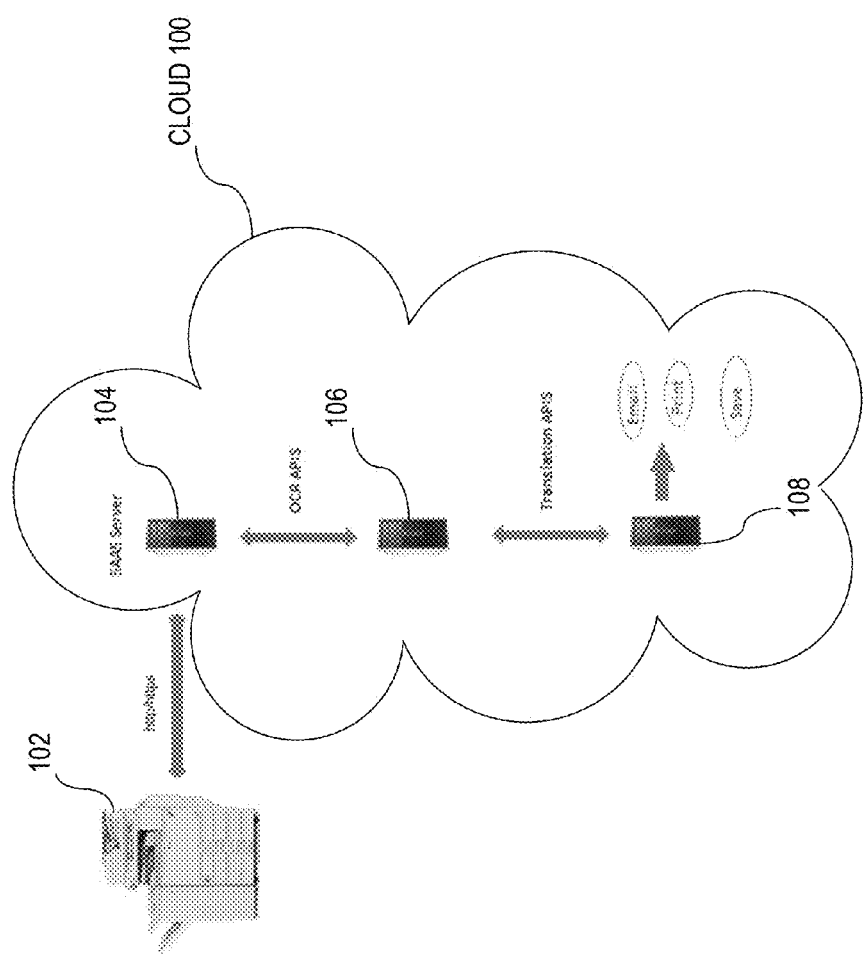
FIG. 1 is a block diagram that illustrates an example of a cloud-based translation service system, according to an embodiment of the invention.

FIG. 1 is a block diagram that illustrates an example of a cloud-based translation service system, according to an embodiment of the invention. The system illustrated in FIG. 1 includes a multi-function peripheral (MFP) 102. An Internet browser application, such as Microsoft Internet Explorer or Mozilla Firefox, executes on MFP 102. The browser application presents, to a user of MFP 102, graphical user interfaces through which the user can provide input to and receive information from MFP 102. Through these interfaces, the user can request services from MFP 102. One example of the services that the user can request from MFP 102 is a scanning service that MFP 102 provides; MFP 102 is, among other things, a scanning device. Services such as the scanning service are, in one embodiment, available via the browser through a local common gateway interface (CGI) and Javascript extensions that are included within the interface pages that the MFP 102 presents to the user through the browser application. A user using the scanning service of MFP 102 places a document within an input tray of MFP 102. In response to the user's instruction to begin scanning, MFP 102 obtains each page of the document, one at a time, from the input tray, scans that image electronically, and produces and stores (in memory) scan data that represents a digital copy of that image. For example, the digital copy may be a bitmap, JPEG, GIF, or PDF image, to name a few formats. The document may contain writing in one of a variety of natural languages that are understandable to human beings. Such writing typically is composed of sequences of words, which are, in turn, made up of one or more characters each. Characters and the character sets to which they belong may differ from language to language.

Through the graphical user interface provided via the browser application, MFP 102 permits a user to instruct MFP 102 to transmit such a digital copy to a Software As A Service (SAAS) server 104. SAAS server 104 does not reside in the same location as MFP 102. SAAS server 104 is considered to be in a computing cloud 100, and provides services to numerous different devices all over the world. SAAS server 104 typically is not owned, operated, or maintained by the owners, operators, or users of MFP 102. MFP 102 is only one of the devices to which SAAS server 104 provides services. MFP 102 interacts with SAAS server 104 over a series of networks which may include local area networks (LANs) and, typically, the Internet. Thus, MFP 102 sends data to SAAS server 104 using the Hypertext Transfer Protocol (HTTP) and/or the secure version of that protocol (HTTPS).

Along with the digital copy of the scanned document that MFP 102 transmits to SAAS server 104, MFP 102 additionally transmits device identification data to SAAS server 104. The device identification data uniquely identifies MFP 102 such that no other device in the world that communicates with SAAS server 104 possesses the same device identifier. MFP 102 may locally store its device identifier, which may be configured by users of MFP 102, so that MFP 102 can transmit its device identifier to SAAS server 104 whenever MFP 102 requests services from SAAS server 104. In addition to the scanned document data and the device identification data, MFP 102 may send, to SAAS server 104, instructions indicating the kinds of services that MFP 102 wants from cloud 100. Such services may be selected by a user of MFP 102 using the graphical user interface that MFP 102 displays via the browser interface. Such services may include, for example, optical character recognition services and natural language translation services. For example, a user of MFP 102 may indicate that he wants the contents of the scanned document to be translated from a source natural language into a target natural language that differs from the source natural language.

SAAS server 104 interacts with other servers in computing cloud 100. In one embodiment, SAAS server 104 interacts with these other servers using application programming interfaces (APIs) that those other servers expose to external entities. SAAS server 104 may utilize the services offered by these other servers, for example, by invoking methods of those APIs with the appropriate parameters. In one embodiment, the other servers whose services SAAS server 104 uses include an optical character recognition (OCR) server 106 and a natural language translation server 108. Using an OCR API exposed by OCR server 106, SAAS server 104 may instruct OCR server 106 to perform OCR services relative to the scanned image data that SAAS server 104 received from MFP 102. The result of the performance of OCR upon the scanned image data is output that specifies sequences of words, comprised of characters, in a natural language. SAAS server 104 also may instruct a translation server 108, also in computing cloud 100, to perform natural language translation on the output produced by OCR server 106. SAAS server 104 may use a translation API exposed by translation server 108 to tell translation server 108 the source and target natural languages for translation. Along with other data that SAAS server 104 passes to OCR server 106 and translation server 108, SAAS server 104 may pass the unique device identifier that SAAS server 104 received from MFP 102 in connection with the scanned image data.

In one embodiment, SAAS server 104 acts as an intermediate broker for all of the other servers in computing cloud 100. For example, SAAS server 104 may send scanned image data to OCR server 106, receive processed data (i.e., optically-recognized character strings) from OCR server 106, send that processed data to translation server 108, and receive further processed data (i.e., the character strings translated into a different natural language) from translation server 108. In an alternative embodiment, however, SAAS server 104 instead instructs each server regarding the next step in a chain of services. In such an embodiment, OCR server 106 may react to these instructions by transmitting its processed output data directly to translation server 108 without further interaction with SAAS server 104. Such instructions, in one embodiment, also include instructions regarding the final processing of the processed data after it has been through the entire server chain. Such instructions may indicate that the processed data is to be e-mailed to a specified e-mail address, and/or printed by a specified printer with a specified Internet address, and/or saved within a specified directory on a specified storage server at a specified Internet address. In one embodiment, these instructions are initially specified by the user of MFP 102 through the graphical user interface, and are passed along from server to server in computing cloud 100 along with the scan data and the unique identifier of MFP 102. The final server in the chain may carry out the disposition instructions for the finally processed data (e.g., data that has undergone both OCR and natural language translation).

Setting Up the MFP

In one embodiment, an administrator of MFP 102 initially sets up MFP 102 with configuration information that is then stored locally in the memory of MFP 102. MFP 102 contains a database that stores configuration information. Among other information that the administrator inputs into this database while configuring MFP 102 is context data that identifies the purpose for which the MFP 102 is used. Such context data may identify the department that primarily uses MFP 102, for example. Under these circumstances, the context data might indicate that MFP 102 is used by an engineering department or a marketing department. As will be seen from the discussion below, the services that are provided to MFP 102 by the servers in computing cloud 100 may be narrowed, refined, and specialized over time based on the context that is represented within the context data with which MFP 102 is initially configured. Additionally or alternatively, the context data may specify a device type of MFP 102.

Additionally, in one embodiment, the administrator of MFP 102 registers MFP 102 with SAAS server 104 in computing cloud 100. Such registration typically includes the assignment of the unique device identifier to MFP 102, which MFP 102 then sends, at registration time, to SAAS server 104 for storage. The registration also includes the transmission of the assigned context data to SAAS server 104 for storage. SAAS server 104 stores a mapping in between the unique device identifier of MFP 102 and the context data that indicates the context or purpose of MFP 102. The mapping of the device identifier to the context data defines which set of rules will be associated with MFP 102. Such rules may be used by various servers in computing cloud 100 to increase the accuracy of the services that they provide to MFP 102. This is because when such a cloud server knows the context of MFP 102, it is able to apply rules (e.g., OCR rules and/or natural language translation rules) that are appropriate specifically for that context and possibly to no other context.

Example User Workflow

Figure 2:
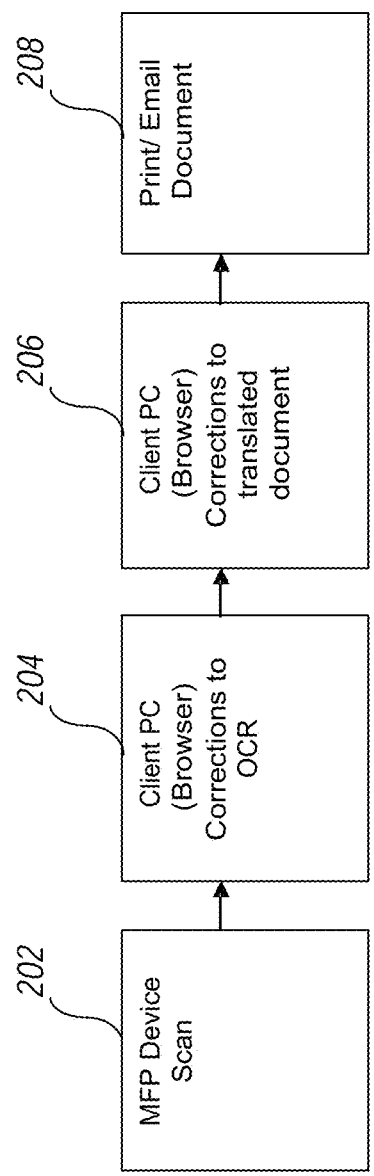
FIG. 2 is a flowchart that illustrates an example of steps that might be taken by a user of the cloud-based translation system shown in FIG. 1, according to an embodiment of the invention.

FIG. 2 is a flowchart that illustrates an example of steps that might be taken by a user of the cloud-based translation system shown in FIG. 1. In block 202, the user scans a document using the MFP (e.g., MFP 102). In block 204, after OCR services have been performed (e.g., by OCR server 106) on the resulting scan data, the user uses a browser application on his client personal computer in order to make corrections, if needed, to the output of the OCR process. In block 206, after natural language translation services have been performed (e.g., by translation server 108) on the corrected OCR output, the user uses the browser application on his client personal computer in order to make corrections, if needed, to the output of the natural language translation process. In block 208, the user is given the option to print and/or e-mail the corrected translated document.

Example System Flow

Figure 3:
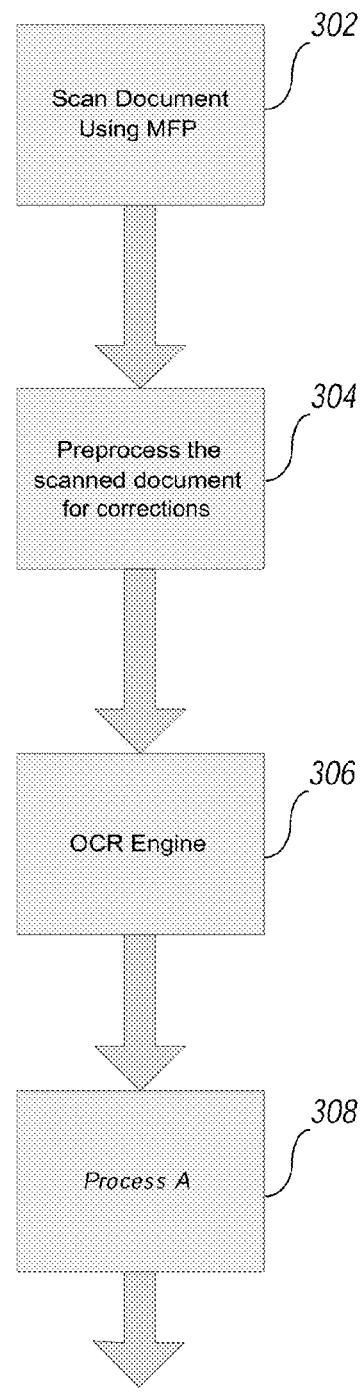
FIGS. 3-5 are flowcharts that illustrate an example of a technique that may be performed collaboratively by various components of the cloud-based translation system shown in FIG. 1, according to an embodiment of the invention.
Figure 4:
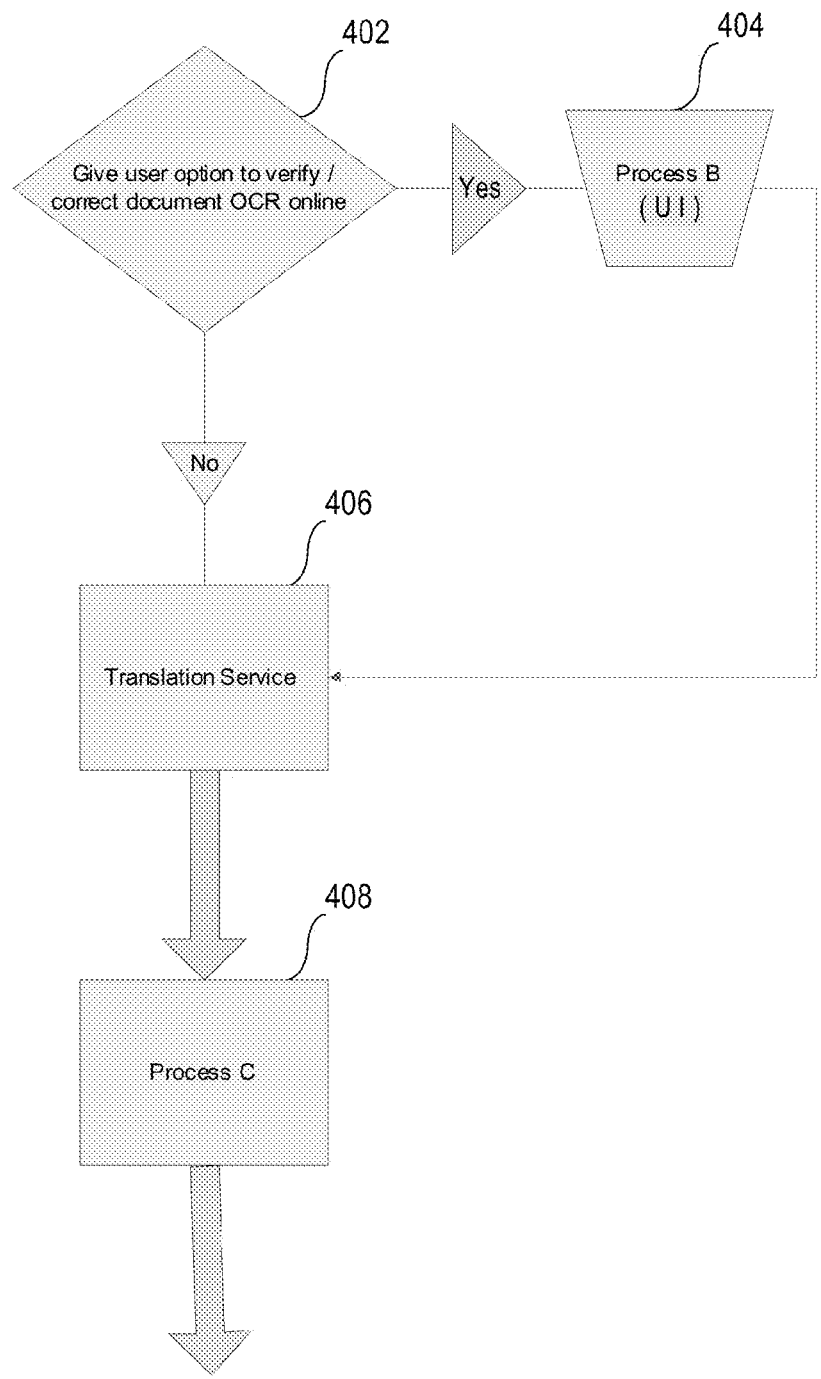
Figure 5:
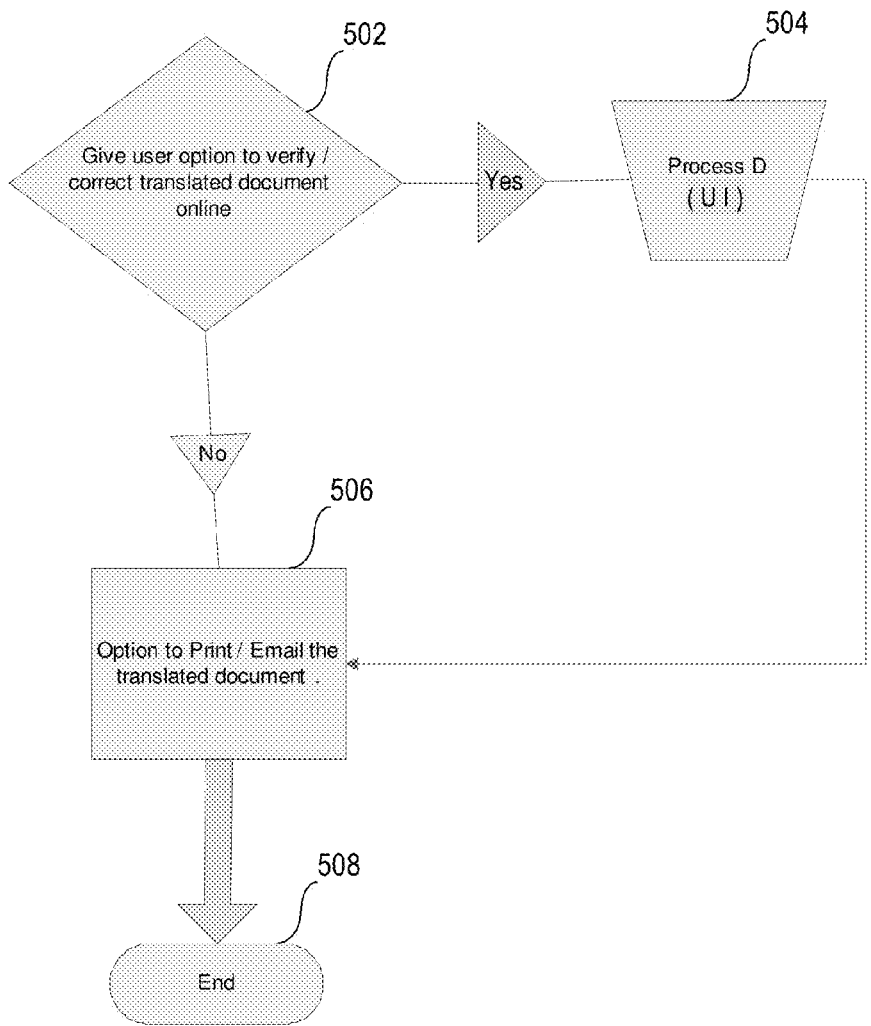

FIGS. 3-5 are flowcharts that illustrate an example of a technique that may be performed collaboratively by various components of the cloud-based translation system shown in FIG. 1. Referring first to FIG. 3, in block 302, the MFP (e.g., MFP 102) scans a document using a scanning application available on the MFP. The MFP stores document details in a document table within a database stored on the MFP. The MFP also assigns a document identifier to the document.

Figure 6:
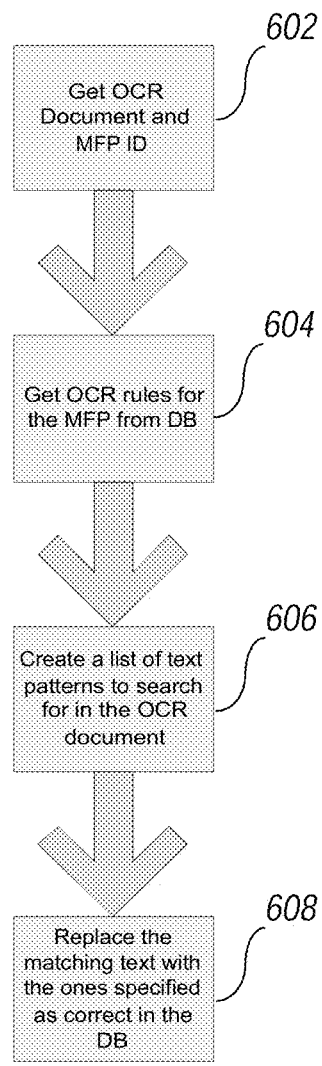
FIG. 6 is a flow diagram that illustrates a technique for correcting OCR output based on MFP context-specific rules, according to an embodiment of the invention.

In block 304, the MFP pre-processes the scanned image to improve contrast, correct skew, etc. In block 306, the MFP then feeds the image into a standard OCR engine within computing cloud 100 (e.g., OCR server 106), potentially via SAAS server 104. In block 308, Process A, discussed in greater detail below in connection with FIG. 6, is performed. Based on the MFP device identifier, specific rules may be applied to update the results of the OCR processing. Control then passes to block 402 of FIG. 4.

Referring now to FIG. 4, in block 402, a user interface is provided to the user so that the user can review both the original document and the results of the OCR processing. The user is given the option to verify and correct the OCR results online. If the user chooses to exercise this option, control passes to block 404. If the user chooses not to exercise this option, then control passes to block 406. Any changes that the user does make are fed back into the database on the MFP. These changes are saved in association with the MFP's context data. The document is saved so that translation can begin.

Figure 7:
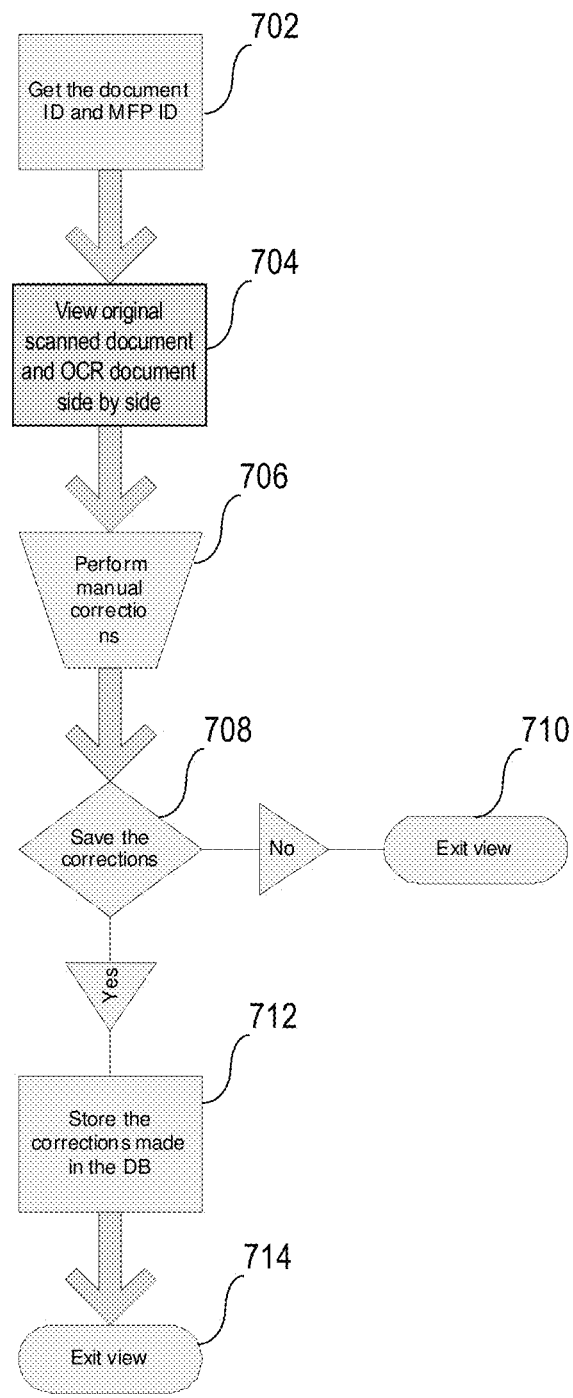
FIG. 7 is a flow diagram that illustrates a technique for updating MFP context-specific OCR correction rules based on corrections that a user makes to the results of OCR processing, according to an embodiment of the invention.

In block 404, Process B, discussed in greater detail below in connection with FIG. 7, is performed. Control then passes to block 406.

Figure 8:
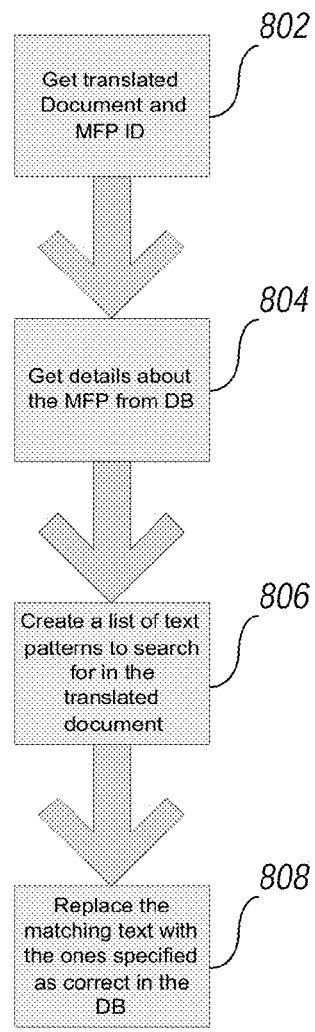
FIG. 8 is a flow diagram that illustrates a technique for correcting natural language translation output based on MFP context-specific rules, according to an embodiment of the invention.

In block 406, the processed data resulting from the OCR processing and any post-processing that has been performed on those OCR results are fed into a translation service (e.g., translation server 108) within computing cloud 100. In block 408, Process C, discussed in greater detail below in connection with FIG. 8, is performed. The results of the translation service are post-processed based on MFP-specific rules. Control then passes to block 502 of FIG. 5.

Referring now to FIG. 5, in block 502, a user interface is provided to the user so that the user can review both the original document and the results of the natural language translation processing. The user is given the option to verify and correct the translation results online. If the user chooses to exercise this option, then control passes to block 504. If the user chooses not to exercise this option, then control passes to block 506. Any changes that the user does make are fed back into the database on the MFP. These changes are saved in association with the MFP's context data. The document is saved.

Figure 9:
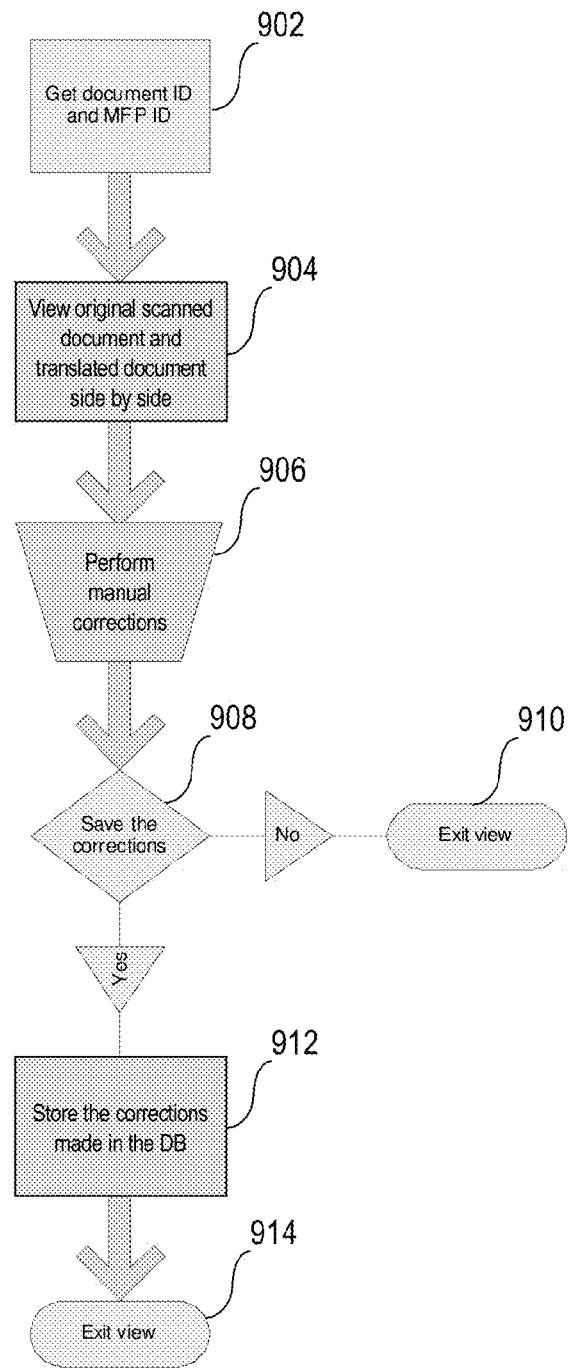
FIG. 9 is a flow diagram that illustrates a technique for updating translation correction rules based on corrections that a user makes to the results of natural language translation processing, according to an embodiment of the invention.

In block 504, Process D, discussed in greater detail below in connection with FIG. 9, is performed. Control then passes to block 506.

In block 506, the user is given the option to print and/or e-mail the translated document, or to save the translated document for later printing and/or e-mailing. In block 508, the technique illustrated in FIGS. 3-5 ends.

Process A—Context-Specific Automatic OCR Correction

FIG. 6 is a flow diagram that illustrates a technique for correcting OCR output based on MFP context-specific rules, according to an embodiment of the invention. The steps illustrated in FIG. 6 collectively form "Process A" referenced above in FIGS. 3-5. The results of OCR processing performed on the scanned document are referred to below as the OCR document. The OCR document contains text that was extracted from the image produced by the MFP's scanner. OCR engine processing may not be absolutely accurate, so some errors may be present within the OCR document. By applying, to the OCR document, MFP context-specific rules that are stored in the database and generated using techniques described herein, the accuracy of OCR processing results can be improved. Software (e.g., software executing on SAAS server 104) generates a list of rules that are associated with the MFP's device identifier. These rules are then applied to the OCR document in order to correct errors automatically.

In block 602, the OCR document and the MFP's device identifier are obtained. The OCR document may be obtained from OCR server 106, for example. Document details for the document can be found in a "Document" table in a database. Context-specific details for the MFP can be found using the MFP's device identifier in a "Device Type" table in a database.

In block 604, OCR rules for the MFP are obtained from a database. The rules applicable to the MFP may be found in an "OCR Rules" table in a database. The specific rules to be applied are associated in the table with the MFP's context data.

In block 606, a list of text patterns to search for in the OCR document is created. The list of patterns is constructed based on the "OCR Rules" that are associated with the MFP's context data. For example, if the MFP's context data indicates an "engineering" context, then all of the rules in the "OCR Rules" table that are associated with the "engineering" context and the OCR document's language are selected for application to the OCR document. Generally, each rule specifies a set of characters that are to be replaced (the text patterns) and a set of characters to replace the characters that are to be replaced.

In block 608, text in the OCR document that matches text to be replaced, as indicated in the list of text patterns created in block 606, is automatically replaced with the corresponding replacement text that is mapped, in the rules, to the matching text. In one embodiment, replacement rules are applied based on priority or importance. Some rules may be ranked higher than others. Higher-ranked rules are applied before lower-ranked rules are. Each rule in the "OCR Rules" table may be associated with a "Usage Count" field. The value stored in this field may be used to determine a rule's rank. In one embodiment, if two or more rules conflict, then "Left Text" and "Right Text" fields in the "OCR Rules" table are used to select one of the conflicting rules whose application is most suitable.

Process B—Updating OCR Correction Rules

FIG. 7 is a flow diagram that illustrates a technique for updating OCR correction rules based on corrections that a user makes to the results of OCR processing, according to an embodiment of the invention. The steps illustrated in FIG. 7 collectively form "Process B" referenced above in FIGS. 3-5. A user interface is provided to the user. The user interface allows the user to view the original scanned document image and the OCR document (potentially with some automatic rules-based corrections already made) side-by-side. The user can use the user interface to make additional corrections. The input from the user is stored in a database and is used by Process A to make automatic rules-based OCR corrections in the future. Thus, the OCR replacement rules may be automatically updated based on the corrections that the user specifies.

In block 702, the document identifier and the MFP's device identifier are obtained. Document details for the document can be found in a "Document" table in a database. Context-specific details for the MFP can be found using the MFP's device identifier in a "Device Type" table in a database. In block 704, the original scanned document and the OCR document are shown to the user side-by-side. For example, these documents may be shown to the user side-by-side in a browser application executing on the user's client personal computer. In block 706, the user uses the user interface (e.g., provided via the browser application) to perform manual corrections to the OCR document. In block 708, the user is given the option to save or abandon the corrections made. If the user opts to save the corrections, then control passes to block 712. If the user opts to abandon the corrections, then control passes to block 710.

In block 710, the side-by-side view of the documents is exited without saving the corrections and without updating the OCR replacement rules. Alternatively, in block 712, the corrections made are stored in the database. The corrections are stored in the "OCR Rules" table. The corrections are associated in the table with the MFP's context data. As is discussed above in connection with FIG. 6, these are the rules that are applied in "Process A" to improve the accuracy of optical character recognition.

Process C—Context-Specific Automatic Translation Correction

FIG. 8 is a flow diagram that illustrates a technique for correcting natural language translation output based on MFP context-specific rules, according to an embodiment of the invention. The steps illustrated in FIG. 8 collectively form "Process C" referenced above in FIGS. 3-5. The results of natural language translation processing performed on the OCR document are referred to below as the translated document. The translated document contains text that was translated from the source natural language of the OCR document (and the original scanned document) to a different, target natural language. Natural language translation engine processing may not be absolutely accurate, so some errors may be present within the translated document. By applying, to the translated document, MFP context-specific rules that are stored in the database and generated using techniques described herein, the accuracy of natural language translation processing results can be improved. Software (e.g., software executing on SAAS server 104) generates a list of rules that are associated with the MFP's device identifier. These rules are then applied to the translated document in order to correct errors automatically.

In block 802, the translated document and the MFP's device identifier are obtained. The translated document may be obtained from translation server 108, for example. Document details for the document can be found in a "Document" table in a database. Context-specific details for the MFP can be found using the MFP's device identifier in a "Device Type" table in a database.

In block 804, translation rules for the MFP are obtained from a database. Other details about the MFP may be obtained from the database as well. The rules applicable to the MFP may be found in a "Translation Rules" table in a database. The specific rules to be applied are associated in the table with the MFP's context data.

In block 806, a list of text patterns to search for in the translated document is created. The list of patterns is constructed based on the "Translation Rules" that are associated with the MFP's context data. For example, if the MFP's context data indicates an "engineering" context, then all of the rules in the "Translation Rules" table that are associated with the "engineering" context and the translated document's language are selected for application to the translated document. Generally, each rule specifies a set of characters that are to be replaced (the text patterns) and a set of characters to replace the characters that are to be replaced.

In block 808, text in the translated document that matches text to be replaced, as indicated in the list of text patterns created in block 806, is automatically replaced with the corresponding replacement text that is mapped, in the rules, to the matching text. In one embodiment, replacement rules are applied based on priority or importance. Some rules may be ranked higher than others. Higher-ranked rules are applied before lower-ranked rules are. Each rule in the "Translation Rules" table may be associated with a "Usage Count" field. The value stored in this field may be used to determine a rule's rank. In one embodiment, if two or more rules conflict, then "Left Text" and "Right Text" fields in the "Translation Rules" table are used to select one of the conflicting rules whose application is most suitable.

Process D—Updating Translation Correction Rules

FIG. 9 is a flow diagram that illustrates a technique for updating translation correction rules based on corrections that a user makes to the results of natural language translation processing, according to an embodiment of the invention. The steps illustrated in FIG. 9 collectively form "Process D" referenced above in FIGS. 3-5. A user interface is provided to the user. The user interface allows the user to view the original scanned document image and the translated document (potentially with some automatic rules-based corrections already made) side-by-side. The user can use the user interface to make additional corrections. The input from the user is stored in a database and is used by Process C to make automatic rules-based translation corrections in the future. Thus, the translation replacement rules may be automatically updated based on the corrections that the user specifies.

In block 902, the document identifier and the MFP's device identifier are obtained. Document details for the document can be found in a "Document" table in a database. Context-specific details for the MFP can be found using the MFP's device identifier in a "Device Type" table in a database. In block 904, the original scanned document and the translated document are shown to the user side-by-side. For example, these documents may be shown to the user side-by-side in a browser application executing on the user's client personal computer. In block 906, the user uses the user interface (e.g., provided via the browser application) to perform manual corrections to the translated document. In block 908, the user is given the option to save or abandon the corrections made. If the user opts to save the corrections, then control passes to block 912. If the user opts to abandon the corrections, then control passes to block 910.

In block 910, the side-by-side view of the documents is exited without saving the corrections and without updating the translation replacement rules. Alternatively, in block 912, the corrections made are stored in the database. The corrections are stored in the "Translation Rules" table. The corrections are associated in the table with the MFP's context data. As is discussed above in connection with FIG. 8, these are the rules that are applied in "Process C" to improve the accuracy of natural language translation.

Figure 10:
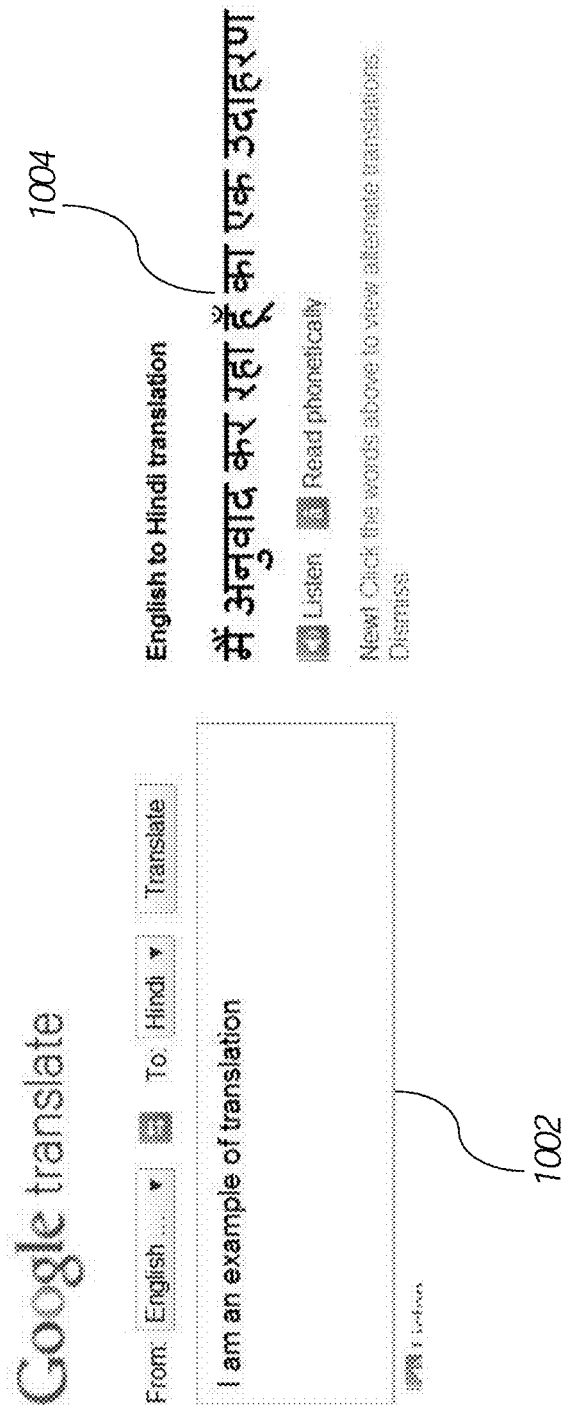
FIG. 10 is a diagram that illustrates an example of a user interface through which a user can view a translation from one natural language to another, according to an embodiment of the invention.

FIG. 10 is a diagram that illustrates an example of a user interface through which a user can view a translation from one natural language to another. A field 1002 contains text that is in a source natural language (in this example, English). The source text reads "I am an example of translation." Result 1004 shows a translation of the text into a target natural language (in this example, Hindi). The translation shown is machine-made and automatic. However, the translation is not entirely correct. As is discussed above, embodiments of the invention allow the user to make corrections to machine-made natural language translation results.

Figure 11:
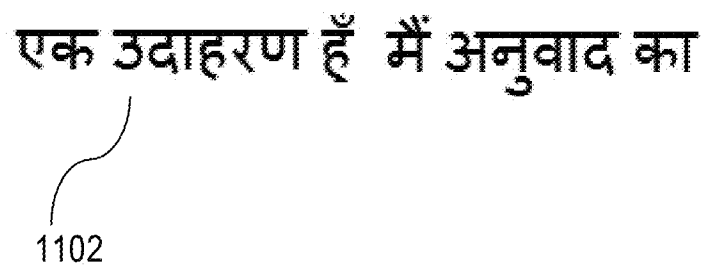

FIG. 11 shows an example of user-corrected translated text that corrects an error in machine-made translation shown in FIG. 10. In one embodiment, as discussed above, user-made corrections to machine-made translations are used to update translation correction rules in the "Translation Rules" table in the database. In the case of this specific example, the next time that a document is translated from English to Hindi, the translation correction software will look for the pattern "I am an example of translation" and replace the machine-made translation text with the user-corrected translation text shown in FIG. 11.

Example Database Schema

As is discussed above, in one embodiment, a database (potentially stored within SAAS server 104) contains multiple tables. These tables contain MFP context-specific information, context-specific OCR correction rules, and context-specific translation correction rules, for example. Discussed below are the structures and formats of tables that are stored in the database according to one embodiment.

The "DeviceType" table stores the known MFP contexts and identifiers associated with those contexts. As is discussed above, an administrator specifies, for each MFP, a context classification that indicates that MFP's device or purpose. Such context classifications may include "engineering," "marketing," or "legal," for example, if these are the departments that primarily use the corresponding MFPs. Because each MFP is associated with a context, and because correction rules are context-specific, the correction rules that are applied to documents scanned by one MFP may differ from correction rules that are applied to documents scanned by another MFP. For each MFP, the correction rules that are applied to documents scanned by that MFP are specifically tailored for correcting the kinds of words that are likely to be found in the vocabulary or jargon that is peculiar to that MFP's context. Because users having the MFP's same context make corrections that are used to update the context-specific rules, the rules for each context are likely to become even more context-specific and produce better OCR and natural language translation corrections for those contexts.

Table 1 shows an example of the structure of the "DeviceType" table. The device type classification field stores an MFP context and the Device Type ID field stores a context identifier for that context. Thus, the "DeviceType" table stores the universe of existing contexts that may be assigned to MFPs.

TABLE 1

| DEVICETYPE | |
|---|---|
| Device Type ID (long) | Device Type Classification (varchar 1000) |

The "MFPDeviceInfo" table stores the context for each MFP. Users register each MFP in part by selecting, from the existing universe of recognized contexts, a specific context (or device type) for that MFP. If the existing universe of recognized contexts (contained in the "DeviceType" table) does not include the desired context, then users can ask an administrator to create a new context in the "DeviceType" table. Table 2 shows an example of the structure of the "MFPDeviceInfo" table. In one embodiment, it is possible for the same MFP to be associated with multiple different contexts in the "MFPDeviceInfo" table. This may be the case when multiple different departments share the same MFP. The "MFP Device ID" field stores the unique device identifier for the MFP. The "Device Type ID" field contains the context identifier that identifies the context for that MFP. The context matching the context identifier can be looked up using the context identifier in the "DeviceType" table discussed above.

TABLE 2

| MFPDEVICEINFO | |
|---|---|
| Device Type ID (long) | MFP Device ID (varchar 1000) |

The "Document" table contains a separate entry for each document that is scanned by an MFP. Thus, in one embodiment, whenever an MFP scans a document, a new entry is created in this table. When a particular document has OCR processing or natural language translation processing performed upon it, the entry for the particular document is automatically updated to indicate the location of the corresponding OCR document and/or translation document. Table 3 shows an example of the structure of the "Document" table. The "Device Type ID" field indicates the context identifier for the context of the MFP that scanned the original document.

TABLE 3

| DOCUMENT | | | | | | | | |
|---|---|---|---|---|---|---|---|---|
| Document ID (long) | Device Type ID (long) | Original Document Language (varchar 1000) | Translated Document Language (varchar 1000) | Original Document Location (varchar 1000) | OCR Document Location (varchar 1000) | Translated Document Location (varchar 1000) | Subject Field (varchar 1000) | Misc Info (varchar 1000) |

The "OCR Rules" table contains the text replacement rules that are applicable to OCR documents. In one embodiment, each rule specifies at least a set of characters to be replaced and a corresponding set of replacement characters to replace the former set. The rules are used by "Process A," discussed above, to correct OCR document errors automatically. Corrections that users manually make in "Process B," discussed above, are used to generate new entries in the "OCR Rules" table. Table 4 shows an example of the structure of the "OCR Rules" table. The "Usage Count" field is updated each time that a rule is applied to an OCR document. As is discussed above, a rule's usage count may be used to determine the priority of that rule's application relative to other rules. Rules with higher usage counts may be applied before rules with lower usage counts. In one embodiment, only rules having the same specified language as the OCR document's original language are applied to that OCR document. In one embodiment, only rules having the same "Device Type ID" (which indicates MFP context) as the OCR document are applied to the OCR document.

TABLE 4

| OCRRULES | | | | | | | | |
|---|---|---|---|---|---|---|---|---|
| Language (varchar 1000) | Device Type ID (long) | Original Text (varchar 1000) | Left Text (varchar 1000) | Right Text (varchar 1000) | Replacement Text (varchar 1000) | Usage Count (long) | Subject Field (varchar 1000) | Misc Info (varchar 1000) |

The "Translation Rules" table contains the text replacement rules that are applicable to translated documents. In one embodiment, each rule specifies at least a set of characters to be replaced and a corresponding set of replacement characters to replace the former set. The rules are used by "Process C," discussed above, to correct translated document errors automatically. Corrections that users manually make in "Process D," discussed above, are used to generate new entries in the "Translation Rules" table. Table 5 shows an example of the structure of the "Translation Rules" table. The "Usage Count" field is updated each time that a rule is applied to a translated document. As is discussed above, a rule's usage count may be used to determine the priority of that rule's application relative to other rules. Rules with higher usage counts may be applied before rules with lower usage counts. In one embodiment, only rules having either the same specified original language as the document's original language or the same specified translated language as the document's translated language are applied to that translated document. In one embodiment, only rules having the same "Device Type ID" (which indicates MFP context) as the translated document are applied to the translated document.

TABLE 5

| TRANSLATIONRULES | | | | | | | | | |
|---|---|---|---|---|---|---|---|---|---|
| Original Document Language (varchar 1000) | Translated Document Language (varchar 1000) | Device Type ID (long) | Original Text (varchar 1000) | Left Text (varchar 1000) | Right Text (varchar 1000) | Replacement Text (varchar 1000) | Usage Count (long) | Subject Field (varchar 1000) | Misc Info (varchar 1000) |

Figure 12:
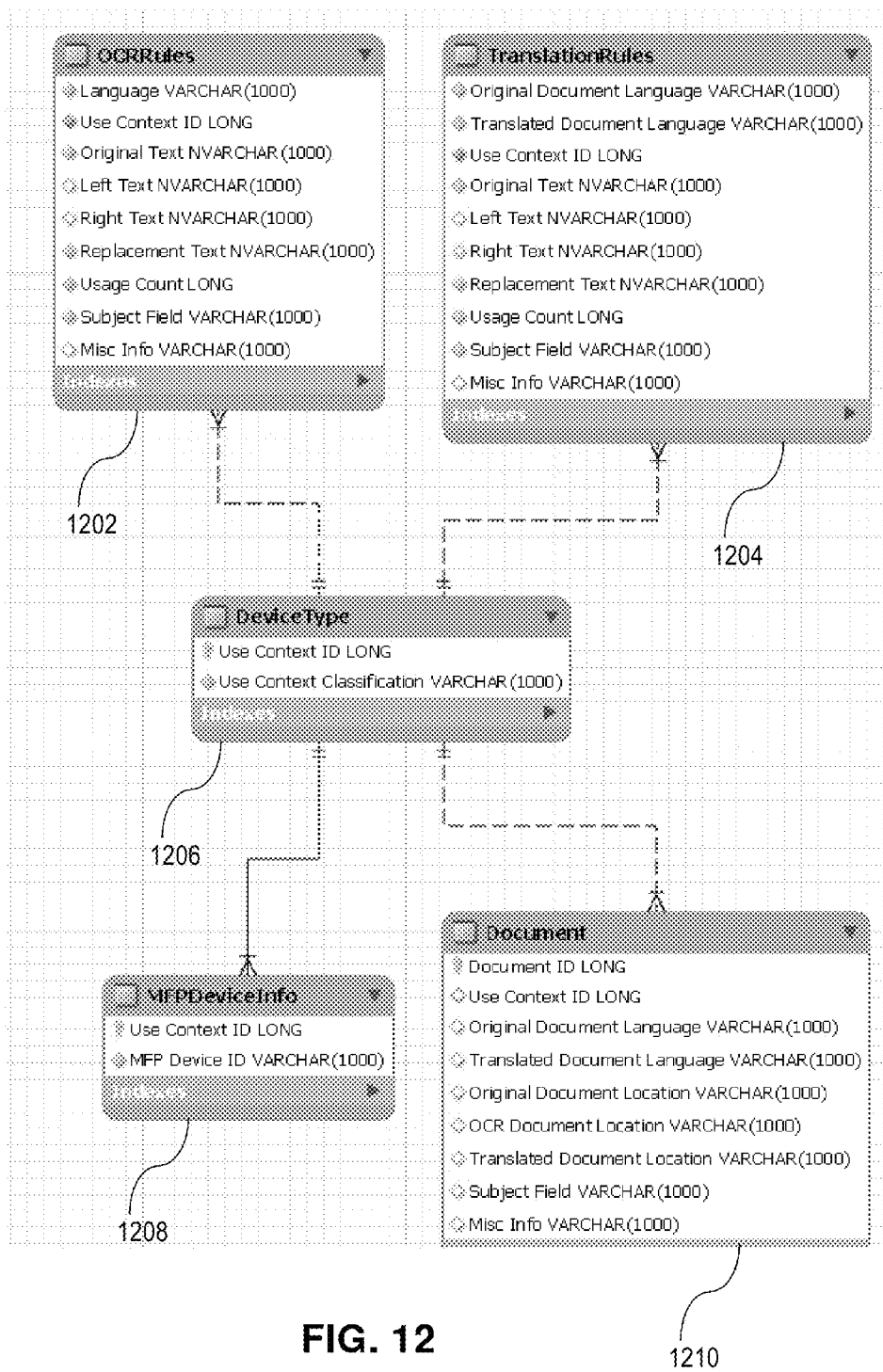
FIG. 12 is a diagram that illustrates an example database schema for a database that stores tables containing information about MFP contexts, documents, OCR correction rules, and translation correction rules, according to an embodiment of the invention.

FIG. 12 is a diagram that illustrates an example database schema for a database that stores tables containing information about MFP contexts, documents, OCR correction rules, and translation correction rules, according to an embodiment of the invention. The database schema shown includes each of the tables discussed above, including "OCR Rules" table 1202, "Translation Rules" table 1204, "DeviceType" table 1206, "MFPDeviceType" table 1208, and "Document" table 1210.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
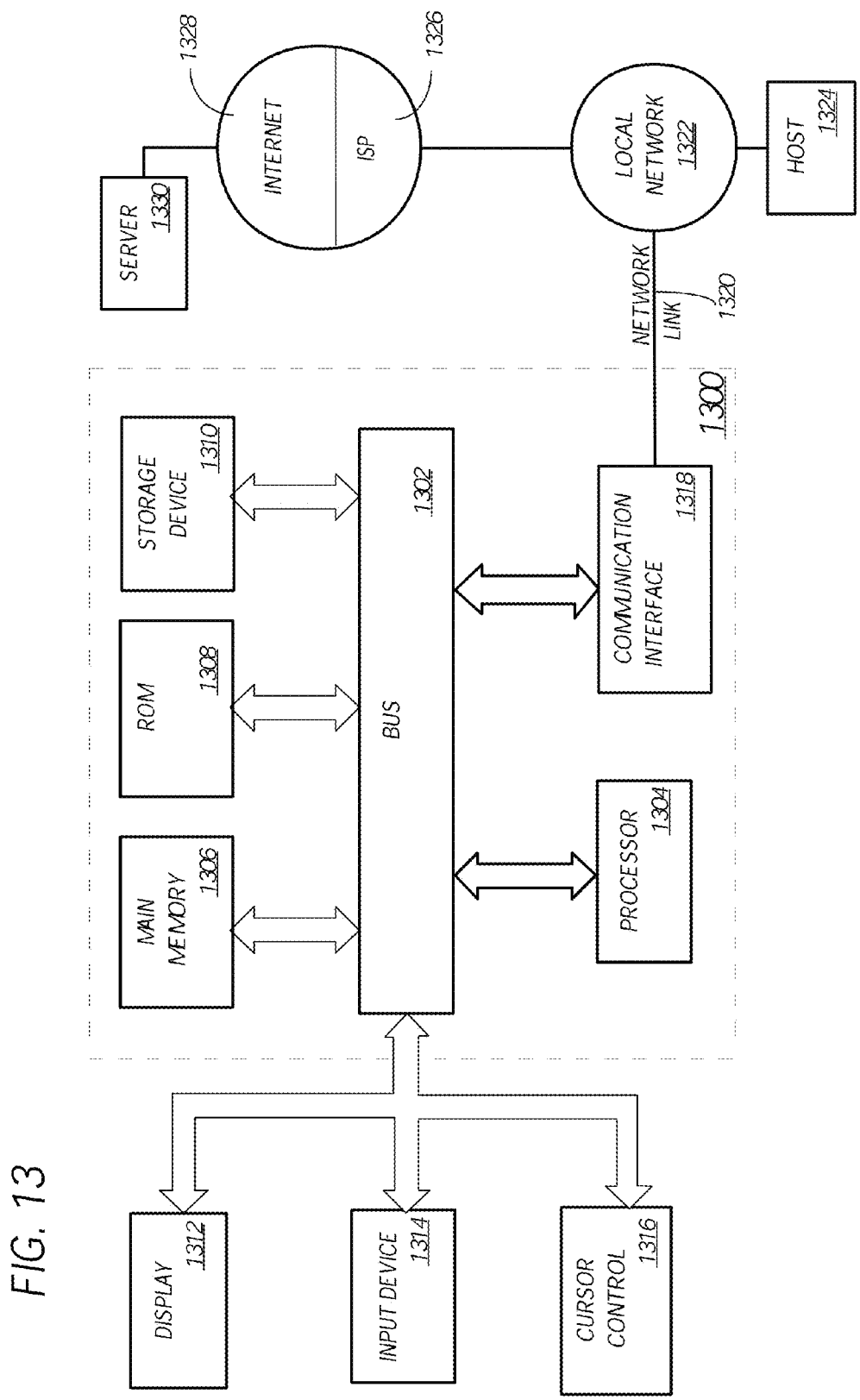
FIG. 13 is a block diagram that illustrates a computer system upon which an embodiment of the invention may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An apparatus comprising:
one or more processors; and
one or more memories communicatively coupled to the one or more processors and storing instructions which, when processed by the one or more processors, cause:
receiving both (a) a particular device identifier that identifies a scanning device associated with a business organization and (b) first processed scan data that was generated by performing one or more of (i) optical character recognition on initial scan data that was generated by the scanning device or (ii) natural language translation on data produced by performing optical character recognition on the initial scan data; and
identifying, from a plurality of mappings of device identifiers to operational contexts of the business organization, a particular mapping of the particular device identifier to a particular operational context of the business organization; and
selecting the particular operational context of the business organization; and
identifying, from a plurality of mappings of operational contexts of the business organization to rules that define, for a set of one or more characters, a set of one or more replacement characters, a particular set of rules that defines, for a set of one or more characters, a set of one or more replacement characters;
selecting the particular set of rules that defines, for a set of one or more characters, a set of one or more replacement characters; and
generating second processed scan data by applying the particular set of rules to the first processed scan data by replacing one or more characters in the processed scan data with the set of one or more replacement characters.

2. The apparatus of claim 1, wherein the first processed scan data is an optical character recognition (OCR) document that was generated by an OCR server as a result of the OCR server performing an OCR process relative to the initial scan data; wherein the OCR server is embodied in a machine that is separate from the scanning device; and wherein the machine in which the OCR server is embodied is accessible by the scanning device through one or more packet networks.

3. The apparatus of claim 1, wherein the first processed scan data is a translated document that was generated by a translation server as a result of the translation server performing a natural language translation process on an optical character recognition (OCR) document that was generated by an OCR server as a result of the OCR server performing an OCR process relative to the initial scan data; wherein the translation server is embodied in a machine that is separate from the scanning device; wherein the machine in which the translation server is embodied is accessible by the scanning device through one or more packet networks; and wherein text of the translated document is in a different natural language than a natural language in which text of the OCR document is.

4. The apparatus of claim 1, wherein the one or more memories store additional instructions which, when processed by the one or more processors, cause:
presenting the second processed scan data to a user;
receiving, from the user, one or more corrections to the second processed scan data; and
updating the particular set of rules based on the one or more corrections.

5. The apparatus of claim 4, wherein the one or more memories store additional instructions which, when processed by the one or more processors, cause:
after updating the particular set of rules to produce an updated set of rules that includes one or more additional rules that were not contained in the particular set of rules prior to the updating, applying the one or more additional rules to additional processed scan data;
wherein the one or more additional rules specify the one or more corrections;
wherein applying the one or more additional rules comprises making the one or more corrections to the additional processed scan data.

6. The apparatus of claim 4, wherein updating the particular set of rules comprises storing one or more additional rules that are (a) mapped to the particular operational context of the business organization to which the particular device identifier is mapped and (b) reflect text substitutions made in the one or more corrections.

7. The apparatus of claim 1, wherein applying the particular set of rules to the first processed scan data comprises selecting, from a plurality of sets of rules, a certain set of rules that is mapped to the particular operational context of the business organization that is mapped to the particular device identifier; and applying the particular set of rules to the first processed scan data; wherein each set of rules in the plurality of sets of rules is mapped to a different operational context of a plurality of operational contexts of the business organization.

8. The apparatus of claim 1, wherein applying the particular set of rules to the first processed scan data comprises selecting, from a plurality of sets of rules, a certain set of rules that is mapped to a particular natural language that is mapped to the initial scan data; wherein each set of rules in the plurality of sets of rules is mapped to a different natural language of a plurality of natural languages.

9. The apparatus of claim 1, wherein the one or more memories store additional instructions which, when processed by the one or more processors, cause:
receiving both the particular device identifier and data that indicates the particular operational context of the business organization in a request to map the particular device identifier to the particular operational context of the business organization; and
in response to the request, adding, to a table, an entry that maps the particular device identifier to the particular operational context of the business organization;
wherein the table maps multiple different device identifiers to the particular operational context of the business organization;

wherein the table maps multiple different operational contexts of the business organization to multiple different device identifiers.

10. The apparatus of claim 1, wherein identifying the particular set of rules that defines, for a set of one or more characters, a set of one or more replacement characters:
   determining whether the first processed scan data is an OCR document or a translation document;
   based on whether the first processed scan data is an OCR document or a translation document, selecting a particular rules table from a plurality of rules tables that comprise (1) a first rules table containing rules that are applicable only to OCR documents and (2) a second rules table containing rules that are applicable only to translation documents; and
   selecting, from the particular rules table, only rules that are mapped to the particular operational context of the business organization to which the particular device identifier is mapped;
   wherein the particular rules table comprises at least one rule that is mapped to an operational context of the business organization other than the particular operational context of the business organization to which the particular device identifier is mapped.

11. One or more non-transitory computer-readable storage media storing instructions which, when processed by one or more computing devices, cause:
   receiving both (a) a particular device identifier that identifies a scanning device associated with a business organization and (b) first processed scan data that was generated by performing one or more of (i) optical character recognition on initial scan data that was generated by the scanning device or (ii) natural language translation on data produced by performing optical character recognition on the initial scan data; and
   identifying, from a plurality of mappings of device identifiers to operational contexts of the business organization, a particular mapping of the particular device identifier to a particular operational context of the business organization; and
   selecting the particular operational context of the business organization; and
   identifying, from a plurality of mappings of operational contexts of the business organization to rules that define, for a set of one or more characters, a set of one or more replacement characters, a particular set of rules that defines, for a set of one or more characters, a set of one or more replacement characters;
   selecting the particular set of rules that defines, for a set of one or more characters, a set of one or more replacement characters; and
   generating second processed scan data by applying the particular set of rules to the first processed scan data by replacing one or more characters in the processed scan data with the set of one or more replacement characters.

12. The one or more non-transitory computer-readable storage media of claim 11, wherein the first processed scan data is an optical character recognition (OCR) document that was generated by an OCR server as a result of the OCR server performing an OCR process relative to the initial scan data; wherein the OCR server is embodied in a machine that is separate from the scanning device; and wherein the machine in which the OCR server is embodied is accessible by the scanning device through one or more packet networks.

13. The one or more non-transitory computer-readable storage media of claim 11, wherein the first processed scan data is a translated document that was generated by a translation server as a result of the translation server performing a natural language translation process on an optical character recognition (OCR) document that was generated by an OCR server as a result of the OCR server performing an OCR process relative to the initial scan data; wherein the translation server is embodied in a machine that is separate from the scanning device; wherein the machine in which the translation server is embodied is accessible by the scanning device through one or more packet networks; and wherein text of the translated document is in a different natural language than a natural language in which text of the OCR document is.

14. The one or more non-transitory computer-readable storage media of claim 11, further comprising additional instructions which, when processed by the one or more computing devices, cause:
   presenting the second processed scan data to a user;
   receiving, from the user, one or more corrections to the second processed scan data; and
   updating the particular set of rules based on the one or more corrections.

15. The one or more non-transitory computer-readable storage media of claim 14, further comprising additional instructions which, when processed by the one or more computing devices, cause:
   after updating the particular set of rules to produce an updated set of rules that includes one or more additional rules that were not contained in the particular set of rules prior to the updating, applying the one or more additional rules to additional processed scan data;
   wherein the one or more additional rules specify the one or more corrections;
   wherein applying the one or more additional rules comprises making the one or more corrections to the additional processed scan data.

16. The one or more non-transitory computer-readable storage media of claim 14, wherein updating particular the set of rules comprises storing one or more additional rules that are (a) mapped to the particular operational context of the business organization to which the particular device identifier is mapped and (b) reflect text substitutions made in the one or more corrections.

17. The one or more non-transitory computer-readable storage media of claim 11, wherein applying the particular set of rules to the first processed scan data comprises selecting, from a plurality of sets of rules, a certain set of rules that is mapped to the particular operational context of the business organization that is mapped to the particular device identifier; and applying the particular set of rules to the first processed scan data; wherein each set of rules in the plurality of sets of rules is mapped to a different operational context of a plurality of operational contexts of the business organization.

18. The one or more non-transitory computer-readable storage media of claim 11, wherein applying the particular set of rules to the first processed scan data comprises selecting, from a plurality of sets of rules, a certain set of rules that is mapped to a particular natural language that is mapped to the initial scan data; wherein each set of rules in the plurality of sets of rules is mapped to a different natural language of a plurality of natural languages.

19. The one or more non-transitory computer-readable storage media of claim 11, further comprising additional instructions which, when processed by the one or more computing devices, cause:
   receiving both the particular device identifier and data that indicates the particular operational context of the business organization in a request to map the particular device identifier to the particular operational context of the business organization; and in response to the request, adding, to a table, an entry that maps the particular device identifier to the particular operational context of the business organization;

wherein the table maps multiple different device identifiers to the particular operational context of the business organization;

wherein the table maps multiple different operational contexts of the business organization to multiple different device identifiers.

20. The one or more non-transitory computer-readable storage media of claim 11, wherein identifying the particular set of rules that defines, for a set of one or more characters, a set of one or more replacement characters:

determining whether the first processed scan data is an OCR document or a translation document;

based on whether the first processed scan data is an OCR document or a translation document, selecting a particular rules table from a plurality of rules tables that comprise (1) a first rules table containing rules that are applicable only to OCR documents and (2) a second rules table containing rules that are applicable only to translation documents; and selecting, from the particular rules table, only rules that are mapped to the particular operational context of the business organization to which the particular device identifier is mapped;

wherein the particular rules table comprises at least one rule that is mapped to an operational context of the business organization other than the particular operational context of the business organization to which the particular device identifier is mapped.

* * * * *